(12) United States Patent
Naumovic

(10) Patent No.: US 8,766,621 B2
(45) Date of Patent: Jul. 1, 2014

(54) ANALOG INPUT MODULE FOR A PROGRAMMABLE LOGIC CONTROLLER

(75) Inventor: Albert Naumovic, Sulzbach-Rosenberg (DE)

(73) Assignee: Siemens Aktiengesellschaft, Munich (DE)

( * ) Notice: Subject to any disclaimer, the term of this patent is extended or adjusted under 35 U.S.C. 154(b) by 329 days.

(21) Appl. No.: 13/215,964

(22) Filed: Aug. 23, 2011

(65) Prior Publication Data

US 2012/0043957 A1     Feb. 23, 2012

(30) Foreign Application Priority Data

Aug. 23, 2010   (EP) ..................................... 10173719

(51) Int. Cl.
*G01R 31/02*          (2006.01)

(52) U.S. Cl.
USPC ........................................................... 324/72

(58) Field of Classification Search
None
See application file for complete search history.

(56) References Cited

U.S. PATENT DOCUMENTS

| | | | | |
|---|---|---|---|---|
| 5,876,122 | A | * | 3/1999 | Eryurek ........................ 374/183 |
| 6,045,260 | A | * | 4/2000 | Schwartz et al. ............. 374/183 |
| 6,711,446 | B2 | * | 3/2004 | Kirkpatrick et al. ............ 700/19 |

OTHER PUBLICATIONS

Siemens SIMATIC ET 200M distributed I/O device HART analog modules (2008).*
Murate Power Solutions: "4-20mA Current Loop Primer DMS-AN-20" Application Note, Jul. 17, 2009, Seiten 1-3.
Dave Harrold: "4-20mA Transmitters Alive and Kicking" Control Engineering Online Oct. 1998.

* cited by examiner

*Primary Examiner* — Melissa Koval
*Assistant Examiner* — Daniel Miller
(74) *Attorney, Agent, or Firm* — Cozen O'Connor

(57) ABSTRACT

An analog input module for a programmable logic controller, wherein the analog input module has a ground potential, and includes a channel output configured at a first electrical potential, a first channel input configured at a second electrical potential where the absolute value of the second electrical potential is less than the absolute value of the first electrical potential and greater than the absolute value of the ground potential. The analog input module also includes a second channel input, and a third channel input, where the ground potential of the analog input module is the ground potential of the channel output, of the first channel input, of the second channel input and of the third channel input.

10 Claims, 3 Drawing Sheets

ANALOG INPUT MODULE FOR A PROGRAMMABLE LOGIC CONTROLLER

BACKGROUND OF THE INVENTION

1. Field of the Invention

The invention relates to an analog input module for a programmable logic controller and, more particularly, to an analog input module having a plurality of channel inputs.

2. Description of the Related Art

In general, analog input modules are well-known. Measuring instruments, such as measuring transducers, thermocouple elements, voltmeters and other measurement circuitry, can be connected to an analog input module in a programmable logic controller. The analog input module forwards signals that are received by the measuring instruments and measurement circuits to an amplifier of the programmable logic controller.

SUMMARY OF THE INVENTION

It is an object of the invention to provide an improved method for operating an analog input module, an improved analog input module, an improved programmable logic controller and an improved automation system.

This and other objects and advantages are achieved in accordance with the invention by a method for operating an analog input module in a programmable logic controller, where the analog input module has a ground potential for a channel output, a first channel input, a second channel input and a third channel input. The same ground potential is therefore used for each of the channel inputs and the channel output. Preferably, the ground potential is specified at 0 volts.

The method comprises connecting a two-wire measuring transducer to the channel output of the analog input module and to the first channel input of the analog input module. A four-wire measuring transducer is connected to the first channel input of the analog input module and to the second channel input of the analog input module. Further, measurement circuits are connected to the second channel input and to the third channel input of the analog input module.

A transformer device is used to generate a first electrical potential that is applied to the channel output. A second electrical potential that is applied to the first channel input is likewise generated by the transformer device. Here, the absolute value of the second electrical potential is less than the absolute value of the first electrical potential and greater than the absolute value of the ground potential. Accordingly, the second electrical potential lies between the ground potential and the first electrical potential. A voltage therefore exists between the first electrical potential and the second electrical potential. The voltage is required for operating the two-wire measuring transducer, because the two-wire measuring transducer does not have an external voltage supply. A potential difference between the first and the second electrical potential is therefore necessary to operate the two-wire measuring transducer. It is important to note that only the absolute values of the first and second electrical potential must be greater than the absolute value of the ground potential. If, for example, the ground potential is 0 volts, the first and second electrical potential can assume both positive and negative values. Here, it should be noted that either both the first electrical potential and the second electrical potential are positive or both the first electrical potential and the second electrical potential are negative.

A current is therefore generated for a functional test of the connected two-wire measuring transducer by a potential difference between the first electrical potential and the second electrical potential. The current is generated independently of a parameterization of the two-wire measuring transducer by the programmable logic controller.

In accordance with an embodiment of the invention, a potential difference is applied between the ground potential and the second channel input. This potential difference can serve, for example, to apply a voltage signal between the first channel input and the second channel input. Preferably, the voltage signal is a common-mode voltage or asymmetrical voltage. Preferably, the absolute value of the voltage is less than the absolute value of the second electrical potential.

The common-mode voltage signal serves to compensate for resistances of the lines leading to the four-wire measuring transducer, and of possible intermediately connected measuring instruments. If, for example, a voltage of 4 volts drops across the cabling and a measuring instrument, a common-mode voltage amounting to 4 volts is applied to compensate for the voltage drop.

Here, the absolute value of the potential difference between the ground potential and the second channel input is less than the absolute value of the second electrical potential.

It is a further object to provide an analog input module for a programmable logic controller. The analog input module has a ground potential. The module comprises at least one channel output, a first channel input, a second channel input and a third channel input. The ground potential of the analog input module is the ground potential of the channel output, of the first channel input, of the second channel input and of the third channel input.

The channel output is configured to lie at a first electrical potential. The first channel input is configured to lie at a second electrical potential. The absolute value of the second electrical potential is less than the absolute value of the first electrical potential and greater than the absolute value of the ground potential. Here, it is important to note that either both the first electrical potential and the second electrical potential are greater than the ground potential, or that both the first electrical potential and the second electrical potential are less than the ground potential.

The analog input module is configured for installation in a programmable logic controller. The programmable logic controller can be disposed, for example, in an automation network.

An automation network can be configured, for example, as an industrial automation network. Such industrial automation networks can be configured and/or provided, e.g., for open-loop and/or closed-loop control of industrial facilities (e.g. production plants or conveyor systems), machinery and/or equipment. In particular, automation networks or industrial automation networks can have realtime communication protocols (e.g., Profinet, Profibus, Real-Time Ethernet) for communication at least between the components involved in the open-loop and/or closed-loop control tasks (e.g., between the control units and the systems and/or machines to be controlled). The secure transmission of data using storage media is likewise covered.

Furthermore, however, in addition to a realtime communication protocol, at least one further communication protocol (which e.g., does not need to be realtime-capable) can also be provided in the automation network or industrial automation network, e.g., for the purpose of monitoring, configuring, reprogramming and/or reparameterizing one or more control units in the automation network.

An automation network can comprise, e.g., hardwired communication components and/or wireless communication components. An automation network can also include at least one automation device.

An automation device can be, for example, a computer, PC and/or controller having control functions and/or control capabilities. In particular, an automation device can be for example an industrial automation device which can be configured and/or provided, e.g., specifically for open-loop and/or closed-loop control of industrial systems. In particular, such automation devices or industrial automation devices can be realtime-capable, i.e., enable open-loop and/or closed-loop control functions to be performed in realtime. To this end, the automation device or industrial automation device can include, e.g., a realtime operating system and/or support at least inter alia a realtime-capable communication protocol for communication purposes (e.g., Profinet, Profibus, Real-Time Ethernet).

An automation network comprises a plurality of sensors and actuators. The actuators and sensors are controlled by at least one control device. The actuators, the sensors and the at least one control device exchange data with one another. An automation protocol is used for the data exchange. The at least one control device controls the actuators, the sensors and the data exchange such that an automatic manufacturing process is executed in which, e.g., a product is manufactured.

An industrial automation device can, e.g., be a programmable logic controller, a module or part of a programmable logic controller, a programmable logic controller integrated in a computer or PC, as well as corresponding field devices, sensors and/or actuators, input and/or output devices or the like for connecting to a programmable logic controller, or the industrial automation device can include such components.

An automation protocol in the context of the present invention is understood to be any type of protocol that is provided, suitable and/or configured for communication with automation devices according to the present description. Such automation protocols can be, for example, the Profibus protocol (e.g., conforming to International Electro-technical Commission (IEC) 61158/EN50170), a Profibus DP protocol, a Profibus PA protocol, a Profinet protocol, a Profinet I/O protocol, a protocol conforming to the AS Interface, a protocol conforming to IO-Link, a KNX protocol, a protocol conforming to a multipoint interface (MPI), a protocol for a point-to-point (PtP) link, a protocol conforming to the specifications of the S7 communication protocol (which is provided and configured, for example, for communication with programmable logic controllers of the company Siemens) or also an Industrial Ethernet protocol or Real-Time Ethernet protocol or further special-purpose protocols for communication with automation equipment. Arbitrary combinations of the above-cited protocols can also be provided as an automation protocol within the meaning of the presently disclosed embodiments of the invention.

The channel output and the first channel input are configured for connecting a two-wire measuring transducer. The first channel input and the second channel input are configured for connecting a four-wire measuring transducer. The second and the third channel input are configured for connecting at least one further measurement circuit.

In accordance with an embodiment of the invention, the analog input module is configured for a voltage to be applied between the second channel input and the ground potential. Here, the absolute value of the voltage between the second channel input and the ground potential is less than the absolute value of the potential difference between the second electrical potential and the ground potential.

In accordance with another embodiment of the invention, the analog input module has a switching device that is configured to output a signal received at one of the channel inputs of the analog input module to an amplifier of the programmable logic controller. In other words, the switching device is configured for switching back and forth between different measuring methods. Depending on the switching arrangement of the switching device, different measurement circuits connected to the channel inputs can therefore be used.

In accordance with the contemplated embodiments of the invention, the analog input module comprises a transformer device having a primary coil and a first and a second secondary coil. The transformer device is configured to generate the first and the second potential by the primary coil and the first secondary coil. The transformer device is additionally configured to generate a supply voltage of the analog input module by the primary coil and the second secondary coil.

In another embodiment of the invention, the supply voltage is a voltage between a third electrical potential and a fourth electrical potential. Here, the third electrical potential is greater than the ground potential and the fourth electrical potential is less than the ground potential. Both the ground potential and the first and the second electrical potential are therefore generated by the transformer device. The transformer device can consist, for example, of two secondary coils and a primary coil. This is particularly space-saving, because both the supply voltage of the analog input module and the first and the second electrical potential are generated with one primary coil. The voltage between the first and the second electrical potential can also comprise a transducer supply for the two-wire measuring transducer.

In accordance with an embodiment of the invention, the at least one further measurement circuit is at least one resistance temperature detector, at least one thermocouple element and/or at least one voltmeter.

In another embodiment the invention, the analog input module has a plurality of channels. Here, each channel has a channel output, a first channel input, a second channel input and a third channel input. Accordingly, each channel can be configured such that a first electrical potential is present at the channel output and a second electrical potential is present at the first channel input. In addition, each channel has a channel-specific ground potential. The ground potential of a first channel therefore does not have to be equal to the ground potential of the second channel. Each channel of the analog input module can be implemented in accordance with the contemplated embodiment of the invention.

It is a further object to provide a programmable logic controller for an automation system having at least one analog input module in accordance with the contemplated embodiments variants of the invention.

It is also an object to provide an automation system having at least one programmable logic controller in accordance with the contemplated embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiment variants of the invention are explained in more detail below with reference to the figures, in which.

DETAILED DESCRIPTION OF THE PRESENTLY PREFERRED EMBODIMENTS

Elements corresponding to one another in the following figures are identified by the same reference signs.

Figure 1:
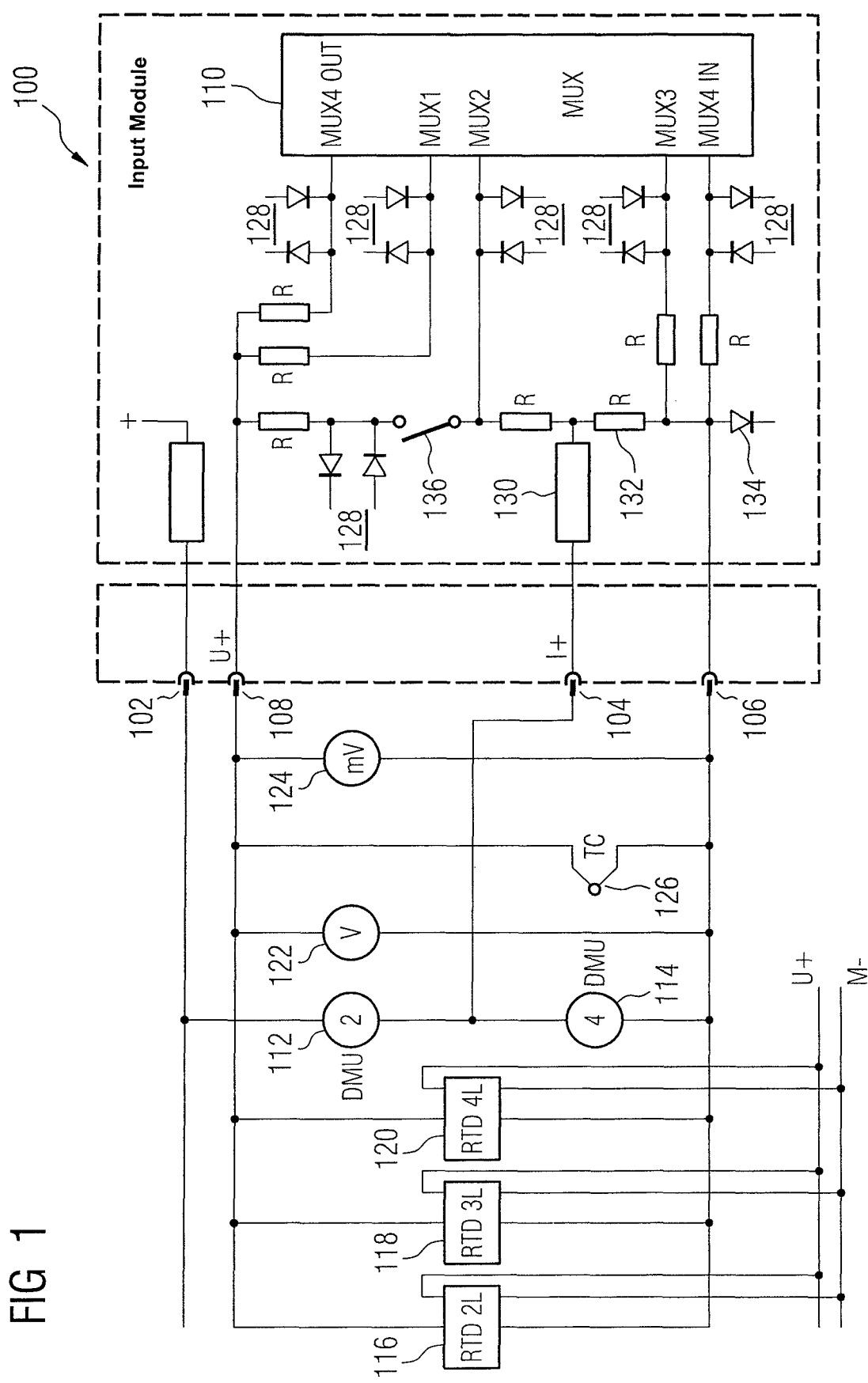
FIG. 1 is an exemplary schematic block diagram of an analog input module with connected measurement circuits in accordance with an embodiment of the invention.

FIG. 1 is an exemplary schematic block diagram of an analog input module 100. The analog input module 100 comprises a channel output 102, a first channel input 104, a second channel input 106 and a third channel input 108. The analog input module 100 also has a multiplexer 110 which is used as a switching device. As an alternative to the multiplexer 110, analog switches or optocouplers can be used. The multiplexer 110 has four inputs Mux1 to Mux4 and one output Mux4out. One two-wire measuring transducer 112 is connected to the channel output 102 and to the first channel input 104. A four-wire measuring transducer 114 is connected to the first channel input 104 and to the second channel input 106. Further measurement circuits, such as resistance measurement circuits 116, 118 and 120, voltage measurement circuits 122 and 124 and a thermocouple element 126, are connected to the second channel input 106 and to the third channel input 108.

The channel inputs 102, 104, 106, 108 all belong to a first channel of the analog input module 100. For purposes of clarity, a second channel is not shown here. It is, however, shown that the resistance measurement circuits 116, 118, 120 are likewise connected to the second channel input 106 of a second channel of the analog input module 100 and to the third channel input 108 of the second channel of the analog input module 100.

The supply voltage of the analog input module 100 is connected by protective diodes 128 to the switching circuit 136 of the analog input module 100. The supply voltage is chosen such that the protective diodes 128 are each connected in the reverse-bias direction. This circuit arrangement serves to protect against overvoltages.

The first channel input 104 is connected to the second channel input 106 by a current-limiting resistor 130 and a shunt resistor 132. The second channel input 106 is connected by a diode 134 to the ground of the transducer supply for the two-wire measuring transducer 112. It is important to note that the ground of the transducer supply for the two-wire measuring transducer 112 is not identical to the ground potential of the channel output 102 and the three channel inputs 104, 106, 108. The two-wire measuring transducer 112 is connected by the output 102 to the positive channel of the transducer supply for the two-wire measuring transducer 112. It is advantageous that the first channel input 104 and the second channel input 106 are connected to the ground of the transducer supply for the two-wire measuring transducer 112 by the diode 134, instead of to the ground of the channel inputs and outputs 102, 104, 106, 108, because a common-mode voltage can be applied at the channel inputs 104 and 106 which, in terms of absolute value, is less than the absolute value of the ground of the transducer supply. If, for example, 11 volts is chosen as the ground of the transducer supply, a common-mode voltage amounting to 10 volts can be applied at the channel inputs 104 and 106. It is important to note that the diode 134 is operated in the reverse-bias direction. Thus, if the ground of the transducer supply is for example +11 volts, the diode is used such that no current flows. This corresponds to the arrangement of the diode 134 in FIG. 1. If a negative value is chosen as the ground of the transducer supply, the diode 134 must accordingly be operated in the opposite direction so that it is also operated in the reverse-bias direction in this case.

By use of the analog input module 100, it is therefore possible for the two-wire measuring transducer 112 to be tested without parameterization by the programmable logic controller, because the transducer supply voltage is present between the channel output 102 and the first channel input 104 at the two-wire measuring transducer 112. It is also possible to apply a common-mode voltage to the four-wire measuring transducer 114 that is connected to the first channel input 104 and the second channel input 106. In terms of absolute value, this common-mode voltage must be less than the absolute value of the potential of the ground of the transducer supply. Line resistances or resistances of measuring instruments connected between the analog input module and the four-wire measuring transducer 114, for example, can be compensated for by the common-mode voltage. If, for example, a voltage of 10 volts drops across the lines and a measuring instrument, this can be compensated for with a common-mode signal amounting to 10 volts.

It is therefore possible by use of the analog input module 100 to test the two-wire measuring transducer 112 without parameterization. It is also made possible for a common-mode signal to be applied to the first and second channel input 104 and 106. This is made possible based on the first and second channel input 104 and 106 being connected to the ground of the transducer supply by the diode 134, which ground is not identical to the ground of the channel inputs 104, 106, 108. The offset of the ground potential of the transducer supply relative to the ground potential of the channel inputs 104, 106, 108 enables the common-mode voltage to be applied without a current flowing to the ground of the transducer supply, because the diode 134 is connected in the reverse-bias direction.

The multiplexer 110 comprises an output by which a signal can be output to an amplifier (not shown). Different signals can be output to the amplifier depending on the circuit layout of the multiplexer 110. For example, signals of the resistance measurement circuits 116, 118, 120 can be output to the amplifier by switching the inputs Mux1 and Mux3. Signals of the two-wire measuring transducer 112 and of the four-wire measuring transducer 114 can be output to the amplifier by switching the inputs Mux2 and Mux3. Signals of the voltage measuring circuits 122 and 124 and also signals of the thermocouple element 126 can likewise be output to the amplifier by switching the inputs Mux1 and Mux3. A voltage divider for measuring higher voltages by the voltage measuring circuit 122 can be realized by closing a switch 136. With switch 136 open, lower voltages are measured by the voltage measuring circuit 124.

Figure 2:
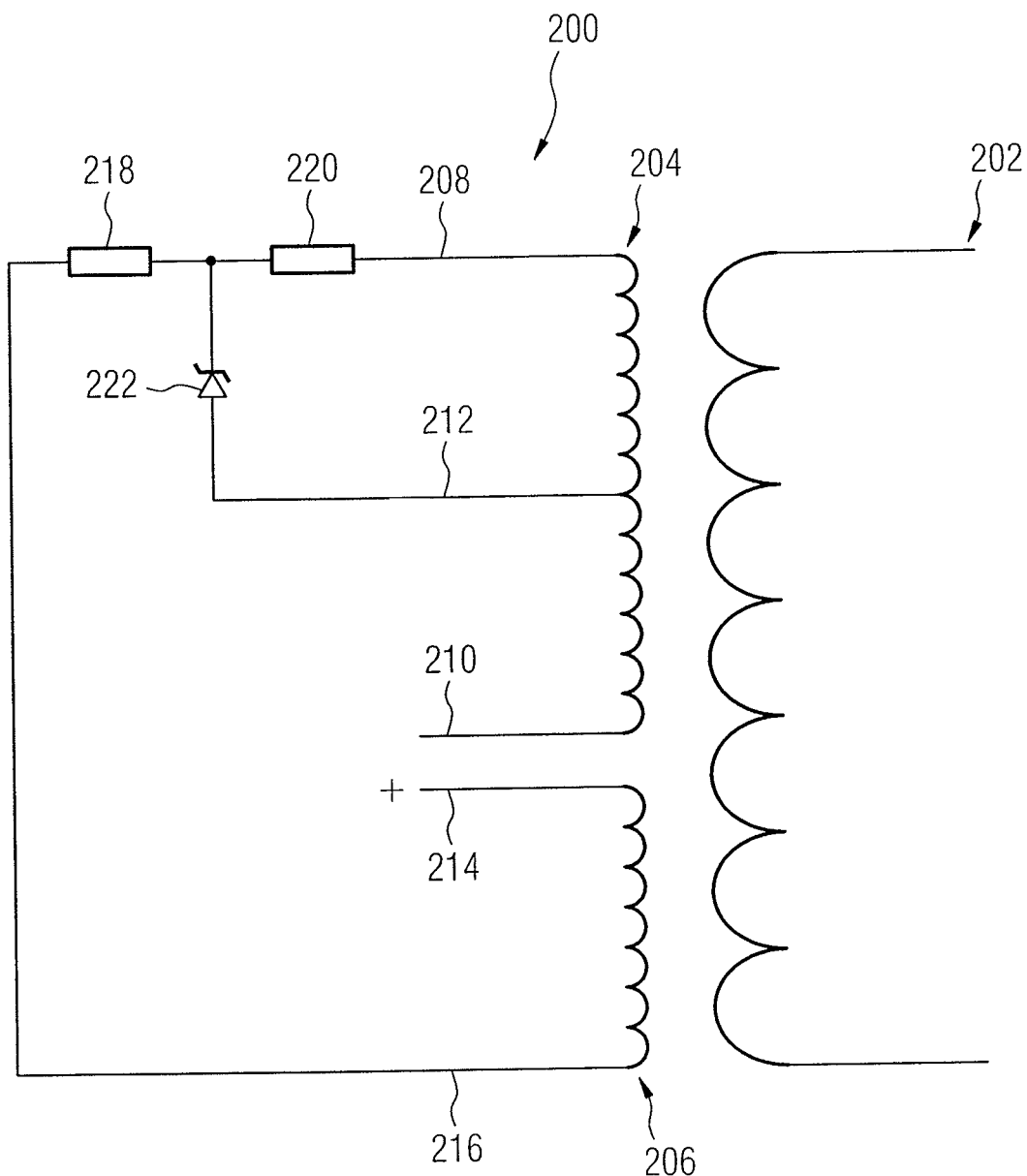
FIG. 2 is an exemplary schematic block diagram of a transformer device of an analog input module with a primary coil and two secondary coils in accordance with an embodiment of the invention.

FIG. 2 is a schematic block diagram of a transformer device 200 for the analog input module 100 of FIG. 1. The transformer device 200 comprises a primary coil 202 and two secondary coils 204 and 206. The primary coil 202 and the secondary coil 204 are used to generate a total of three potentials which are used in the analog input module 100 (not shown). The positive supply voltage 208 is generated at the first end of the secondary coil 204 and the negative supply voltage 210 is generated at the second end of the secondary coil 204. The ground potential for the channel inputs of the analog input module 100 (not shown) is picked off in the middle of the secondary coil 204. Preferably the ground potential 212 is set at 0 volts. Consequently, the absolute value of the positive supply voltage 208 is equal to the absolute value of the negative supply voltage 210.

The transducer supply for the two-wire measuring transducer is generated by the primary coil 202 and the secondary coil 206. The positive potential of the transducer supply 214 is picked off at a first end of the secondary coil 206 and the ground of the transducer supply 216 is picked off at a second end of the secondary coil 206. The ground of the transducer supply 216 is connected to the positive supply voltage 208 by an overcurrent protection element 218 and a resistor 220. In addition, the ground of the transducer supply 216 is connected to the ground potential 212 by the overcurrent protection element 218 and a diode 222. The diode 222 is operated in the reverse-bias direction and serves to ensure that no short-circuit is produced between the ground potential 212 and the ground of the transducer supply 216.

Figure 3:
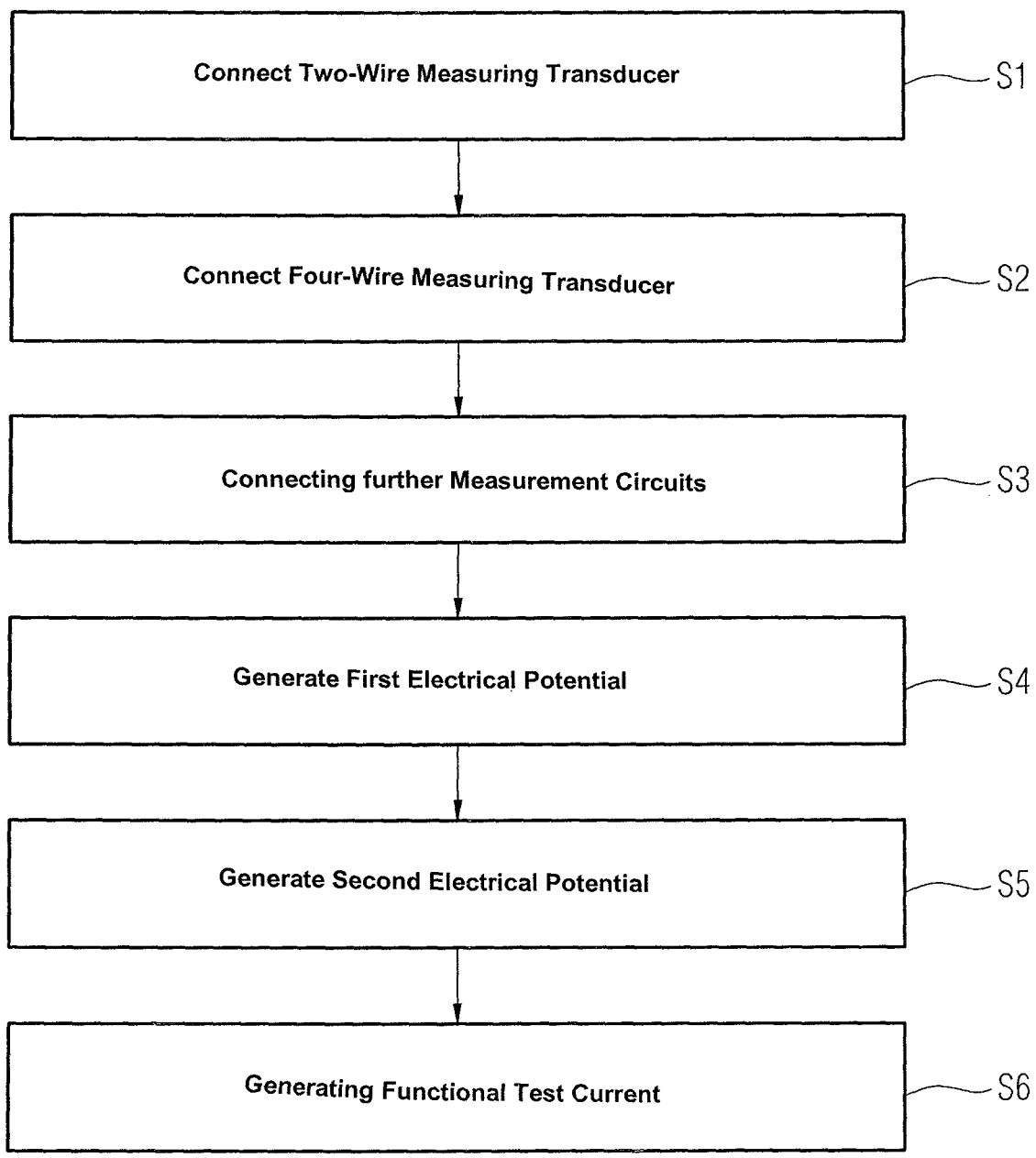
FIG. 3 is a flowchart of a method in accordance embodiment of the invention.

FIG. 3 is a flowchart of a method in accordance with an embodiment of the invention. In a first step S1, a two-wire measuring transducer is connected to the channel output of the analog input module and to the first channel input of the analog input module. In step S2, a four-wire measuring transducer is connected to the first channel input of the analog input module and to the second channel input of the analog input module. In step S3, further measurement circuits can be connected to the second channel input and to the third channel input of the analog input module.

A first electrical potential is generated in step S5. The first electrical potential is present at the channel output. The first electrical potential is generated with the aid of a transformer device. In step S6, a second electrical potential that is present at the first channel input is also generated with the aid of the transformer device. Here, the absolute value of the second electrical potential is less than the absolute value of the first electrical potential and greater than the absolute value of the ground potential.

In step S6, moreover, a current is generated for the purpose of performing a functional test of the connected two-wire measuring transducer. The current is generated as a result of a potential difference between the first electrical potential and the second electrical potential.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an analog input module in a programmable logic controller, the analog input module having a ground potential for a channel output, for a first channel input, for a second channel input and for a third channel input, the method comprising:

connecting a two-wire measuring transducer to the channel output of the analog input module and to the first channel input of the analog input module;

connecting a four-wire measuring transducer to the first channel input of the analog input module and to the second channel input of the analog input module;

connecting at least one further measurement circuit to the second channel input and to the third channel input of the analog input module;

generating a first electrical potential which is present at the channel output using a transformer device;

generating a second electrical potential which is present at the first channel input using the transformer device, an absolute value of the second electrical potential being less than an absolute value of the first electrical potential and greater than an absolute value of a ground potential; and generating a current for performing a functional test of the connected two-wire measuring transducer as a result of a potential difference between the first electrical potential and the second electrical potential.

2. The method as claimed in claim 1, further comprising: applying a potential difference between the ground potential and the second channel input.

3. An analog input module for a programmable logic controller, the analog input module having a ground potential, comprising:

a channel output at a first electrical potential;

a first channel input at a second electrical potential, an absolute value of the second electrical potential being less than an absolute value of the first electrical potential and greater than an absolute value of the ground potential;

a second channel input;

a third channel input;

a two-wire measuring transducer operatively coupled to the channel output and the first channel input; and a four-wire measuring transducer operatively coupled to the first channel input and the second channel input;

wherein the second and the third channel input are configured for connecting at least one further measurement circuit; and wherein the ground potential of the analog input module is the ground potential of the channel output, of the first channel input, of the second channel input and of the third channel input.

4. The analog input module as claimed in claim 3, wherein the analog input module is embodied for a voltage to be applied between the second channel input and the ground potential, an absolute value of the voltage to be applied between the second channel input and the ground potential being less than an absolute value of a potential difference between the second electrical potential and the ground potential.

5. The analog input module as claimed in claim 3, further comprising:

a switching device configured to output a received signal.

6. The analog input module as claimed in claim 4, further comprising:

a switching device configured to output a received signal.

7. The analog input module as claimed in claim 3, further comprising:

a transformer device having a primary coil and a first and second secondary coil, the transformer device being configured to generate the first and second potentials by the primary coil and the first secondary coil, and being configured to generate a supply voltage of the analog input module by the primary coil and the second secondary coil.

8. The analog input module as claimed in claim 7, wherein the supply voltage is a voltage between a third electrical potential and a fourth electrical potential, the third electrical potential being greater than the ground potential, and the fourth electrical potential being less than the ground potential.

9. The analog input module as claimed in claim 3, wherein the at least one further measurement circuit comprises at least one of a resistance temperature detector, a thermocouple element and a voltmeter.

10. The analog input module as claimed in claim 3, wherein the analog input module has a plurality of channels, each of said plurality channels having a channel output, a first channel input, a second channel input and a third channel input.

* * * * *